United States Patent
Lu et al.

(10) Patent No.: US 8,308,111 B2
(45) Date of Patent: Nov. 13, 2012

(54) PANEL ASSEMBLY FOR A SPACE-BASED POWER GENERATION SYSTEM

(75) Inventors: Cheng-Yi Lu, West Hills, CA (US); David Wait, Westlake Village, CA (US); Brian M. Sutin, Claremont, CA (US); Rick L. Howerton, Simi Valley, CA (US); Kenneth John Metcalf, Simi Valley, CA (US); Marcelo Bromberg, Simi Valley, CA (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 618 days.

(21) Appl. No.: 12/512,531

(22) Filed: Jul. 30, 2009

(65) Prior Publication Data

US 2011/0023484 A1   Feb. 3, 2011

(51) Int. Cl.
*B64G 1/44* (2006.01)
*H01L 31/045* (2006.01)
*H01L 31/052* (2006.01)
*F24J 2/16* (2006.01)
*F24J 2/18* (2006.01)
*F03G 6/06* (2006.01)
*G02B 5/10* (2006.01)

(52) U.S. Cl. .......... 244/172.7; 244/172.6; 136/245; 136/246; 126/686; 60/641.15; 359/853; 359/857

(58) Field of Classification Search ............ 244/172.7, 244/172.8, 172.9, 158.1, 159.4, 159.5, 172.6, 244/168; 126/589, 624, 625, 627, 682, 683, 126/684

See application file for complete search history.

(56) References Cited

U.S. PATENT DOCUMENTS

| | | | |
|---|---|---|---|
| 2,124,146 A * | 7/1938 | Miller | 359/851 |
| 4,282,394 A * | 8/1981 | Lackey et al. | 136/245 |
| 4,784,700 A * | 11/1988 | Stern et al. | 136/248 |
| 4,815,525 A | 3/1989 | Readman | |
| 4,830,097 A | 5/1989 | Tanzer | |
| 4,876,854 A | 10/1989 | Owens | |
| 4,896,507 A | 1/1990 | Hosford | |
| 4,947,825 A | 8/1990 | Moriarty | |
| 5,027,892 A | 7/1991 | Bannon et al. | |
| 5,520,747 A * | 5/1996 | Marks | 136/245 |
| 5,727,619 A | 3/1998 | Yao et al. | |
| 5,785,280 A * | 7/1998 | Baghdasarian | 244/172.6 |
| 6,010,096 A * | 1/2000 | Baghdasarian | 244/172.6 |
| 6,020,554 A | 2/2000 | Kaminar et al. | |
| 6,075,200 A | 6/2000 | O'Neill | |
| 6,111,190 A | 8/2000 | O'Neill | |
| 6,118,067 A | 9/2000 | Lashley et al. | |
| 6,609,683 B2 * | 8/2003 | Bauer et al. | 244/172.6 |
| 6,962,421 B2 * | 11/2005 | Yang | 359/846 |
| 7,015,873 B1 | 3/2006 | Talley | |
| 2006/0171113 A1* | 8/2006 | Wu | 361/687 |
| 2008/0041440 A1* | 2/2008 | O'Connell et al. | 136/246 |

* cited by examiner

*Primary Examiner* — Rob Swiatek
*Assistant Examiner* — Marc Burgess
(74) *Attorney, Agent, or Firm* — Carlson, Gaskey & Olds PC

(57) ABSTRACT

An example space-based power generation panel arrangement includes a first reflective panel and at least one heat pipe configured to communicate thermal energy to the first reflective panel and a second reflective panel. The heat pipe is configured to hinge the first reflective panel to the second reflective panel.

18 Claims, 6 Drawing Sheets

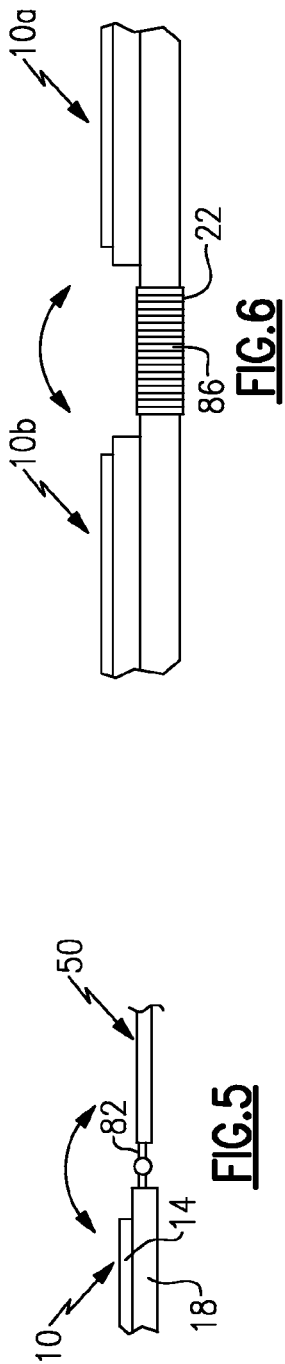

ism. One type of power
PANEL ASSEMBLY FOR A SPACE-BASED POWER GENERATION SYSTEM

BACKGROUND

This invention relates to moveably securing reflective panel assemblies of a space-based power generation system.

As known, many space-based power generation systems utilize reflectors to direct solar energy. One type of power generation system uses reflectors to direct solar energy toward an arrangement of photovoltaic cells, which then produce power. Various types of devices utilize the produced power.

Some devices, such as radar and lidar devices, require relatively high levels of power. Space-based power generation systems responsible for powering these devices often incorporate concentrated photovoltaic cells to produce the higher levels of power. Managing thermal energy in the power generation systems that produce the higher levels of power is often difficult, especially in power generation systems having concentration ratios higher than 20 (i.e., 20 times the sun). The structures incorporated for thermal energy management also disadvantageously increase the mass and complexity of these power generation systems.

SUMMARY

An example space-based power generation panel arrangement includes a first reflective panel and at least one heat pipe configured to communicate thermal energy to the first reflective panel and a second reflective panel. The heat pipe is configured to hinge the first reflective panel to the second reflective panel.

An example space power generation assembly includes a plurality of reflective panels and a plate. A plurality of conduits are configured to communicate thermal energy between the plurality of reflective panels and the plate. Some of the plurality of conduits hingeably connect the plurality of reflective panels.

An example method of moveably securing reflective panel assemblies includes communicating thermal energy to a plurality of reflective panels using a conduit and hingeably connecting the plurality of reflective panels using the conduit.

BRIEF DESCRIPTION OF THE DRAWINGS

FIG. 5 shows a section view at line 5-5 of FIG. 4.

FIG. 6 shows a section view at line 6-6 of FIG. 4.

FIG. 7 shows a section view at line 7-7 of FIG. 4.

FIG. 10 shows a section view at line 10-10 of FIG. 4.

DETAILED DESCRIPTION

Figure 1:
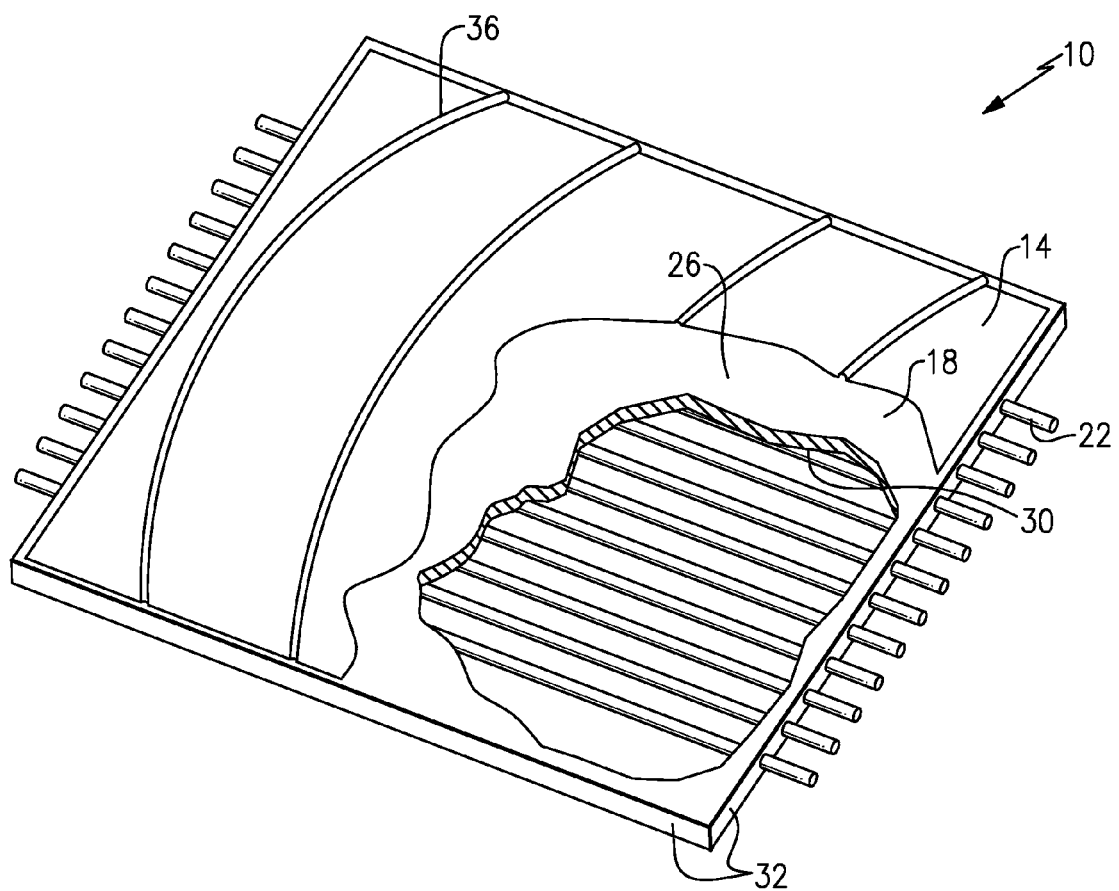
FIG. 1 shows an example reflective and radiating panel assembly.

Referring to FIG. 1, an example reflective and radiating panel assembly 10 includes a reflective layer 14, a base portion 18, and a plurality of heat pipes 22. The reflective layer 14 is secured adjacent an upper surface 26 of the base portion 18. The heat pipes 22 are secured adjacent a lower surface 30 of the base portion 18. A plurality of side surfaces 32 span between the upper surface 26 and the lower surface 30. The side surfaces 32 are dimensionally smaller than the upper surface 26 and the lower surface 30.

The example reflective layer 14 includes a plurality of concentrating elements 36 that provide the panel assembly 10 with a multifaceted reflecting surface. The concentrating elements 36 project about 0.3-0.5 mm from the surrounding surface of the generally planar reflective layer 14. The example concentrating elements 36 have a low areal density.

In this example, the plurality of the heat pipes 22 are mounted to the lower surface 30 of the base portion 18 of the panel assembly 10. The heat pipes 22, a type of conduit, are configured to carry thermal energy to panel assembly 10. The panel assembly 10 facilitates radiating the thermal energy carried by the fluid within the heat pipes 22 to the space environment. In this example, the panel assembly 10 is referred to as a Radflector™ because of the combination of reflecting and radiating properties.

Figure 2:
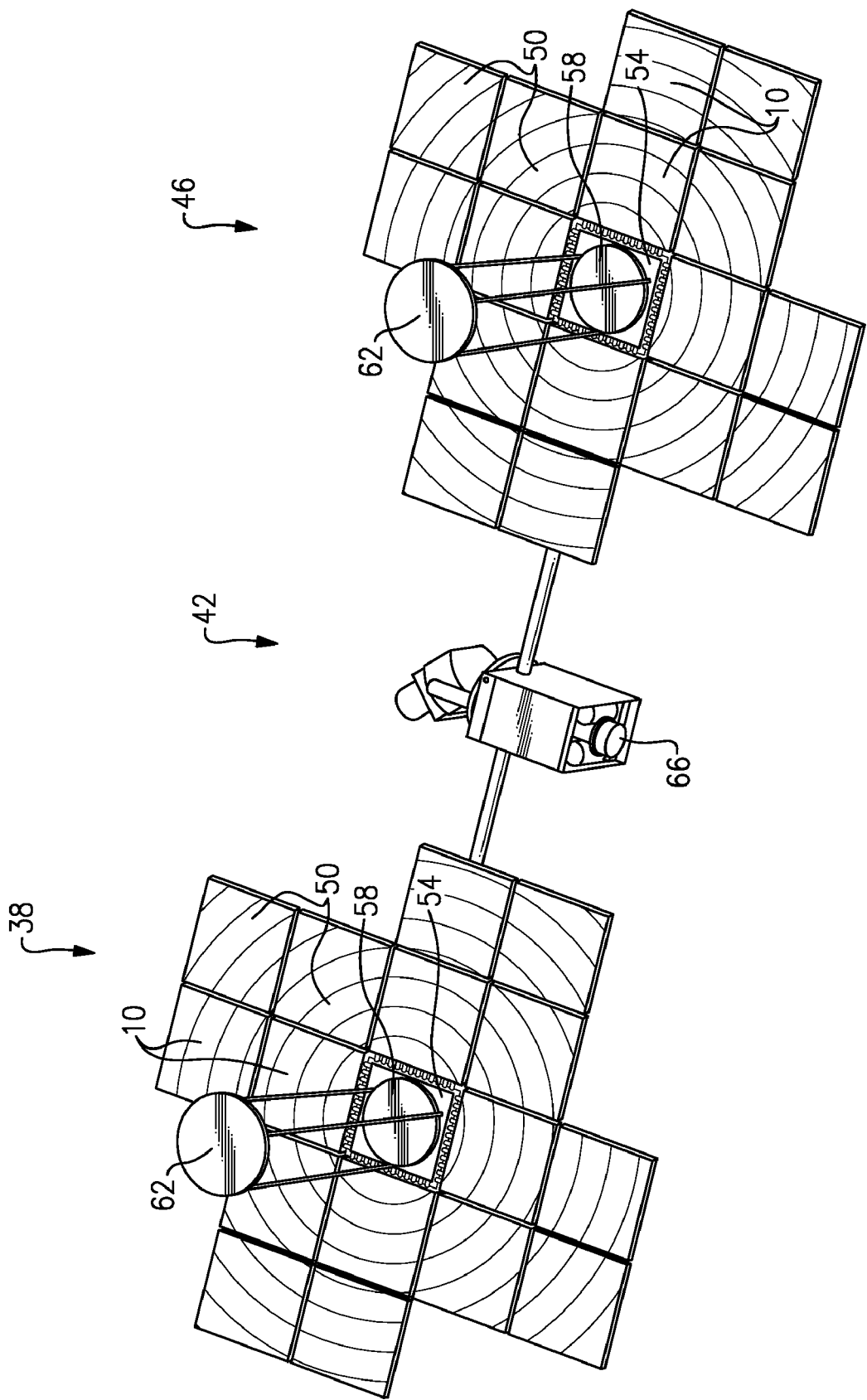
FIG. 2 shows an example space-based power generation system incorporating a multiple of the FIG. 1 panel and powering an example device.

Referring to FIG. 2, a space-based power generation system 38 and a second space-based power generation system 46 power a spacecraft bus device 42. In this example, the power generation systems 38 and 46 are shown in a deployed position in a space environment, which is a position appropriate for generating power.

In this example, the power generation systems 38 and 46 include multiple panel assemblies 10, which form a solar concentration subsystem for the power generation systems 38 and 46. The power generation systems 38 and 46 also each include multiple reflector sheets 50. Notably, the reflector sheets 50 lack the heat pipes 22 and the base portion 18 of the panel assemblies 10.

The panel assemblies 10 and reflector sheets 50 are circumferentially arranged about a cold plate 54. An array of photovoltaic cells 58 is disposed on the cold plate 54. The reflector sheet 50 and the reflective layer 14 of the panel assemblies 10 direct solar energy to a secondary reflector 62 above the cold plate 54. The secondary reflector 62 is generally planar, but has a slight hyperbolic reflecting surface that directs the solar energy downward toward the arrangement of photovoltaic cells 58, which then utilize the solar energy to generate power. The solar energy and power generation results in high levels of thermal energy near the cold plate 54. The array of photovoltaic cells 58 comprises concentrated photovoltaic cells in this example.

The power generation systems 38 and 46 transmit the generated power to the spacecraft bus device 42. An electric propulsion system 66 propels the on-orbit spacecraft 42 using the generated power from the power generation systems 38 and 46.

Figure 3:
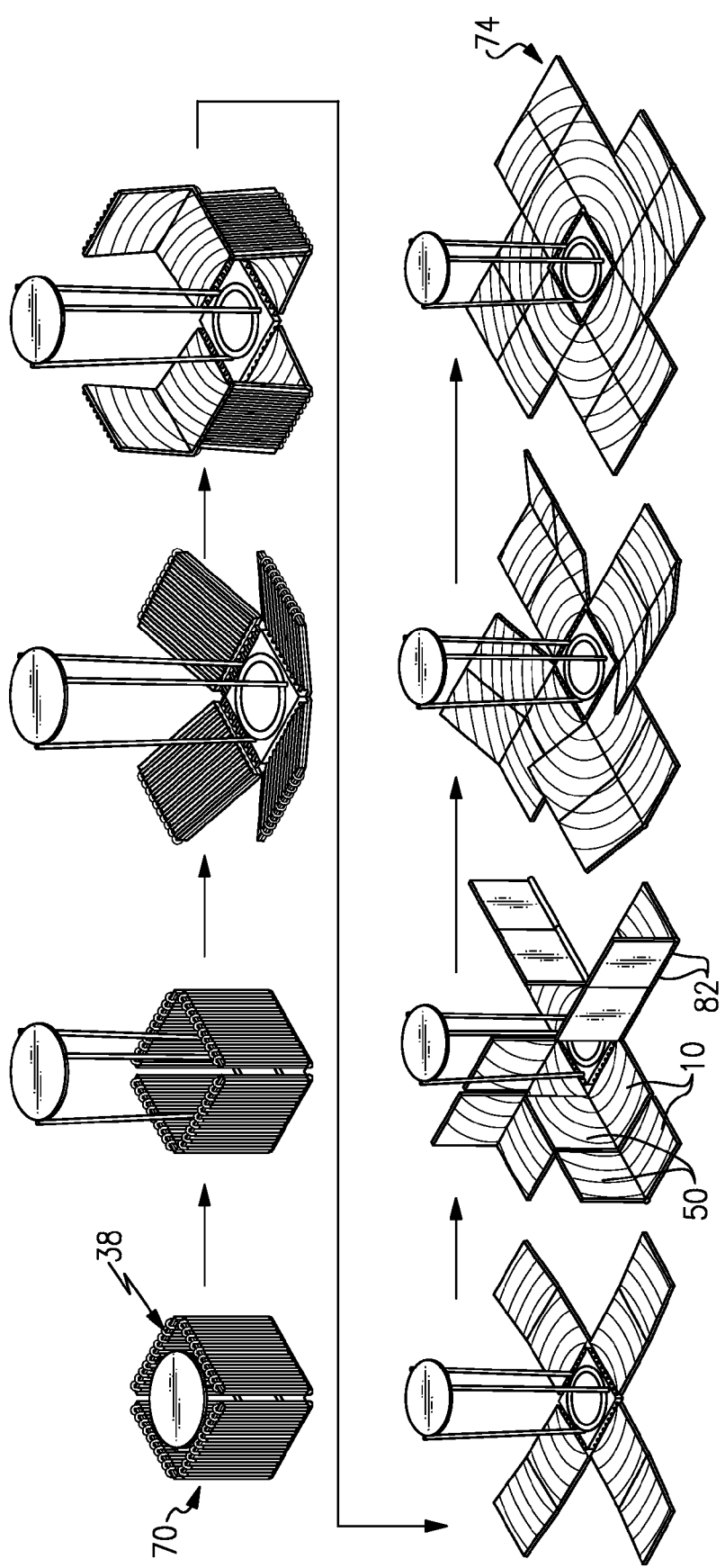
FIG. 3 shows example positions of FIG. 2 system as the system moves from a stowed position to a deployed position.

Referring to FIG. 3, the power generation system 38 is launched into space in a stowed position 70. In this example, the panel assemblies 10 and the reflector sheets 50 are folded when the power generation system 38 is in the stowed position 70. The panel assemblies 10 and the reflector sheets 50 unfold as the power generation system 38 moves to a deployed position 74.

Figure 4:
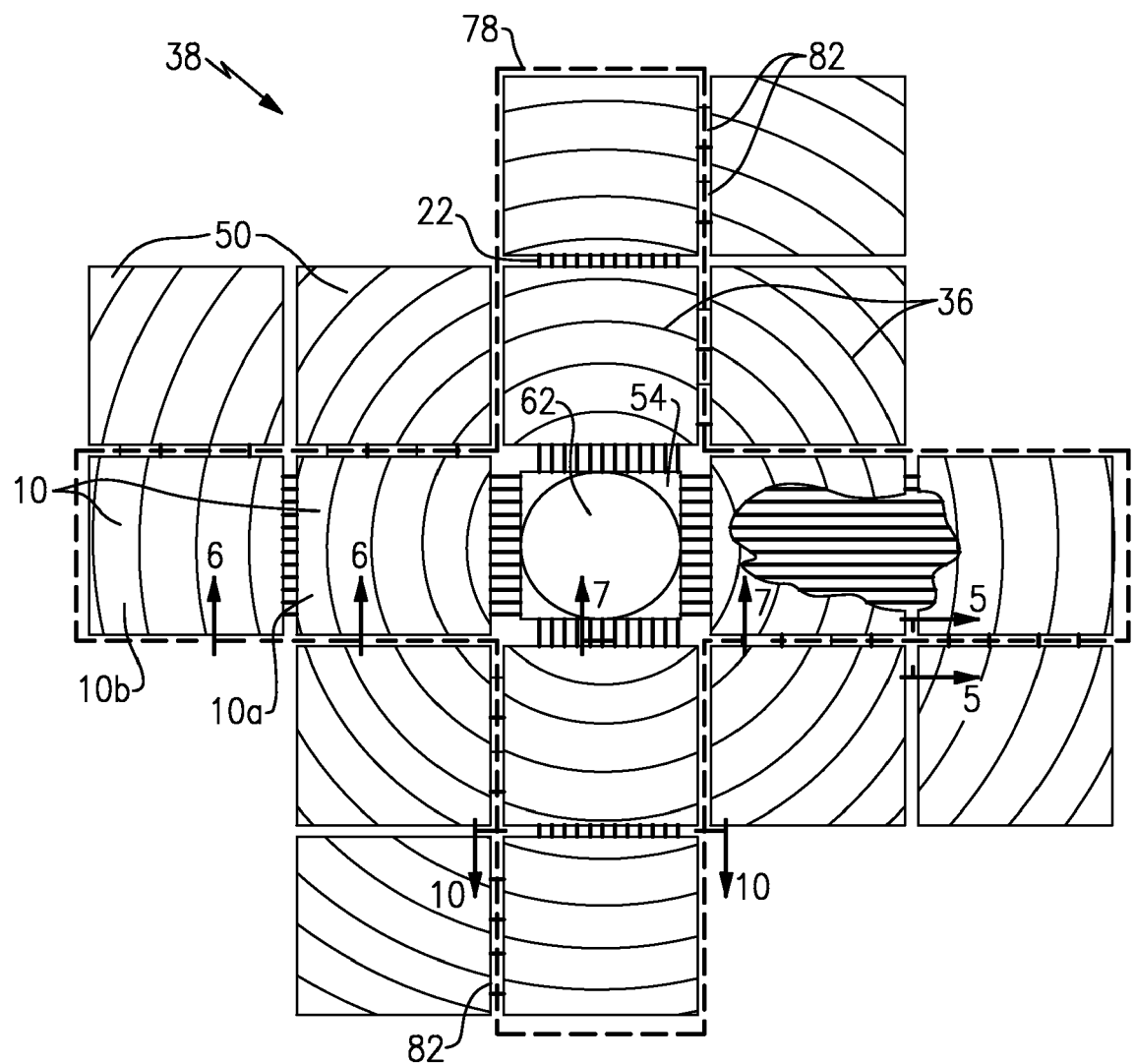
FIG. 4 shows a top view of the FIG. 2 system in a deployed position.

Referring to FIG. 4, an area of the power generation system 38 bounded by a dashed line 78 includes the panel assembles 10, the reflector sheets 50 are outside area bounded by the dashed line. As shown, the heat pipes 22 extend radially from the cold plate 54, to radially inner panel assemblies 10a, and then to radially outer panel assemblies 10b.

In the deployed position 74, the concentrating elements 36 of the panel assemblies 10 and the concentrating elements 36 of the reflector sheets 50 are arranged in concentric rings, which facilitate reflecting solar energy toward the secondary reflector 62. The panel assemblies 10 and the reflector sheets 50 together provide a Fresnel reflector.

As can be appreciated from the Figures, the reflective layer 14 of the panel assemblies 10 are aligned in the same plane when the power generation system 38 is in the deployed position 74. The plane established by the reflective layer 14 of the panel assemblies 10 is aligned with the secondary reflector 62 in this example. In this example, an upper surface of the reflector sheet 50 is about 1.7 m by 1.7 m, which is about the same size as the reflective layer 14 of the panel assemblies 10. The example reflector sheets 50 include a reflective portion comprising an aluminized Kapton® polyimide film.

Referring to FIG. 5 with continuing reference to FIGS. 3-4, a plurality of mechanical hinges 82 secure the reflector sheets 50 relative to the panel assemblies 10. The mechanical hinges 82 enable pivoting movements of the reflector sheets 50 relative to the panel assembly 10, which facilitates moving the power generation system 38 from the stowed position 70 to the deployed position 74.

Referring to FIG. 6, the panel assembly 10a is hingeably connected to the panel assembly 10b through the heat pipes 22. In this example, the heat pipes 22 include a flexible hose portion 86 that facilitates hingeably moving of the panel assemblies 10a and 10b relative to each other. In this example, the flexible hose portion 86 permits single-degree-of-freedom motion of the panel assembly 10a relative to the panel assembly 10b. The example flexible hose portion 86 thus allows the panel assembly 10a to fold over on the panel assembly 10b while limiting sideways movement of the panel assemblies 10a and 10b relative to each other. Because the heat pipes 22 enable movement between the panel assemblies 10a and 10b, no additional hinges structures are needed between the panel assemblies 10a and 10b.

The reflective layer 14 of the panel assemblies 10 is about 0.076 mm thick aluminized Kapton® polyimide film, for example, and the base portion 18 is a graphite-epoxy panel that is about 0.254 mm thick.

Figure 8:
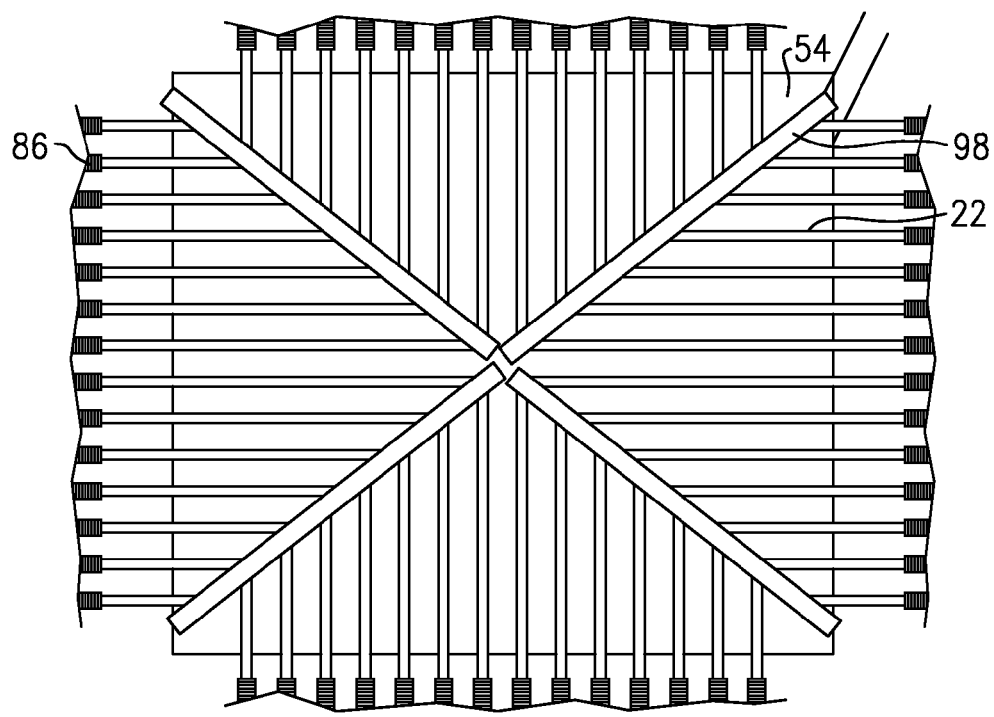
FIG. 8 shows a bottom view of the cold plate portion of the FIG. 2 system.
Figure 9:
FIG. 9 shows a heat pipe of the FIG. 2 system.

Referring to FIGS. 7-9, the panel assembly 10a is hingeably connected to the cold plate 54 through the heat pipes 22. In the deployed position shown, the panel assembly 10 is aligned within the same plane as the cold plate 54. In a stowed position, the panel assembly 10 is stored approximately at a 90° angle relative to the cold plate in a position aligned with line 94.

A person having ordinary skill in this art, and having the benefit of this disclosure, would understand how to move the panel assemblies 10 and the reflector sheets 50 from the stowed position 70 to the deployed position 74 utilizing the mechanical hinges 82 and the flexible hose portion 86 of the heat pipes 22. Motors (not shown) are used in one example to move the panel assemblies 10 and the reflector sheets 50, as well as the secondary reflector 62, from the stowed position 70 to the deployed position 74.

The example heat pipes 22 are thermally coupled with the cold plate 54 to facilitate thermal energy transfer between the cold plate 54, the heat pipes 22, and the panel assemblies 10. A thermal spread 98 separates the heat pipes 22 thermally coupled within the cold plate 54 from other groups of the heat pipes 22 that are in a different radial position relative to the cold plate 54. The heat pipes 22 form part of the thermal energy rejection subsystem of the power generation systems 38 and 46 (FIG. 2).

In this example, the diameter of the heat pipes 22 are about 13.7 mm, and the wall thickness is about 0.0254 cm. The heat pipes 22 include a portion embedded within the cold plate 54 that is about 0.25 m-0.85 m long. The flexible hose portion 86 of the heat pipes 22 is about 0.2 m long, and the portions of the heat pipes 22 secured to the panel assemblies 10 is about 1.7 m long.

Referring to FIG. 10, twelve of the heat pipes 22 are thermally coupled to each of the panel assemblies 10.

Features of the disclosed examples include utilizing a common support structure, motors, and hinging features to deploy a solar concentration subsystem and a thermal energy rejection subsystem. Another feature is an optical configuration that utilizes low area density Fresnel optical elements combined with a secondary concentrator to concentrate solar flux on a photovoltaic array. Yet another feature includes a multi-faceted primary reflecting surface and a hyperbolic secondary reflecting surface that together provide a highly compact, defocused image providing increased tolerance for pointing and tracking errors. Yet another feature includes a power generation system that produces 130 W/kg of power, that can be scaled from 20-80 kWe.

Although a preferred embodiment has been disclosed, a worker of ordinary skill in this art would recognize that certain modifications would come within the scope of this invention. For that reason, the following claims should be studied to determine the true scope and content of this invention.

We claim:

1. A space-based solar focusing panel arrangement comprising:
   a first reflective panel; and
   at least one heat pipe configured to communicate thermal energy to the first reflective panel and a second reflective panel, wherein the heat pipe is configured to hingeably secures the first reflective panel to the second reflective panel wherein the first reflective panel is hingeably moveable relative to the second reflective panel between a first position and a second position, the first reflective panel aligned with the second reflective panel in the first position, and also wherein the first reflective panel and the second reflective panel each establish laterally extending planes, and the first reflective panel and the second reflective panel are in the same plane when the first reflective panel is in the first position,
   a secondary reflector, wherein the plurality of reflective panels are aligned with the secondary reflector and spaced therefrom when the plurality of reflective panels are in the deployed position, and said secondary reflector is aligned with a centrally located power generation means.

2. The arrangement of claim 1 wherein the first reflective panel is stacked on top of the second reflective panel when the first reflective panel is in the second position.

3. The arrangement of claim 1 wherein the at least one heat pipe comprises a flex hose portion.

4. The arrangement of claim 1 wherein the first reflective panel comprises a base portion, the at least one heat pipe secured relative to a first side of the base portion and a reflector surface secured relative to an opposite side of the base portion.

5. The arrangement of claim 4 wherein the base portion comprises a graphite-epoxy material.

6. The arrangement of claim 4 the reflector surface comprises a Fresnel reflector.

7. The arrangement of claim 4 wherein the first panel is hingeably moveable relative to the second panel to a stowed position.

8. The arrangement of claim 1, wherein the first and second reflective panels are both planar.

9. The arrangement of claim 8, wherein the first and second reflective panels are moveable between deployed and stowed positions, and planes defined by the first and second reflective panels are in aligned when the first and second reflective panels are in the deployed and stowed positions.

10. The arrangement of claim 1, including a third reflective panel hingeably secured to the second reflective panel, wherein the first reflective panel pivots relative to the second reflective panel about a first axis, and the third reflective panel pivots relative to the second reflective panel about a second axis that is generally perpendicular to the first axis.

11. A space-based solar focusing panel assembly comprising:
    a plurality of reflective panels;
    a cold plate; and
    a plurality of conduits configured to communicate thermal energy between one of the plurality of reflective panels to another of the plurality of reflective panels and the plate, wherein some of the plurality of conduits hingeably connect the plurality of reflective panels wherein the plurality of reflective panels are hingeably moveable between a stowed position and a deployed position, wherein the reflective panels are aligned within the same plane in the deployed position;
    a secondary reflector, wherein the plurality of reflective panels are aligned with the secondary reflector and spaced therefrom when the plurality of reflective panels are in the deployed position, and said secondary reflector is aligned with a centrally located power generation means.

12. The assembly of claim 11 wherein some of the plurality conduits hingeably connects some of the plurality of reflector panels to the cold plate.

13. The assembly of claim 11 wherein the reflector panels are circumferentially distributed about the cold plate.

14. The assembly of claim 11 wherein a plurality of concentrated photovoltaic cells are mounted on one side of the cold plate, wherein the plurality of conduits are thermally coupled to on the opposite side of the cold plate.

15. A method of moveably securing reflective panel assemblies comprising:
    communicating thermal energy to a plurality of reflective panels using a conduit; and
    hingeably connecting the plurality of reflective panels directly to each other using the conduit pivoting the panels between a stowed position and a deployed position, wherein each of the panels extends within a plane, and the planes of the panels are aligned in the stowed position and the deployed position; and
    providing a secondary reflector, wherein the plurality of reflective panels are aligned with the secondary reflector and spaced therefrom when the plurality of reflective panels are in the deployed position.

16. The method of claim 15 wherein the reflective panels comprise Fresnal reflector on a first surface and the conduit secured to a second surface opposite the first surface.

17. The method of claim 15 including flexing at least a portion of the conduit when hinging.

18. The method of claim 15 including hingeably connecting at least some of the plurality of reflective panels to a cold plate using the conduit.

* * * * *